May 19, 1936.  E. L. NESS  2,041,262
MASSAGING AND CLEANSING DEVICE FOR TEETH AND GUMS
Filed Sept. 23, 1933
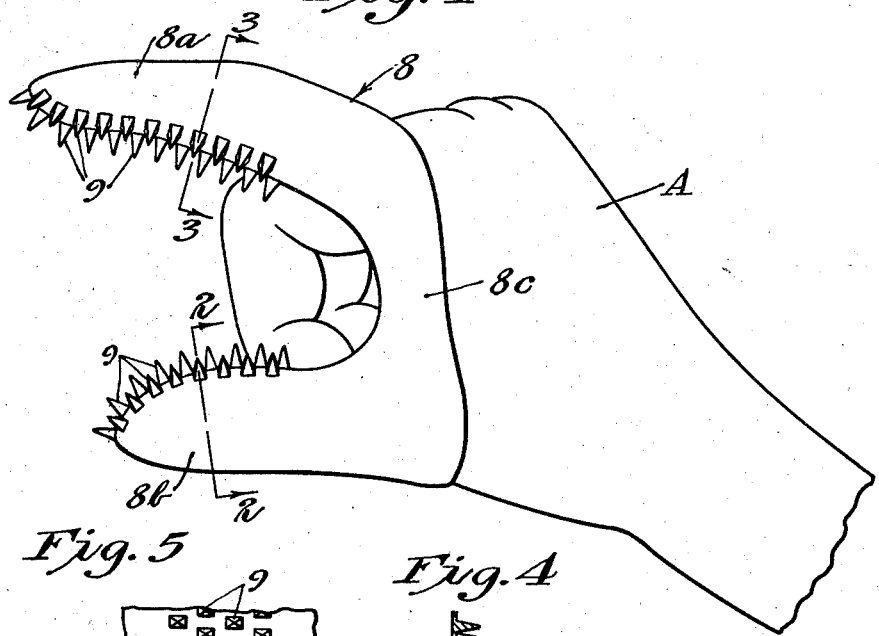
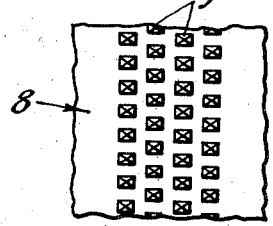
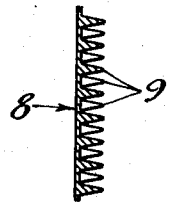
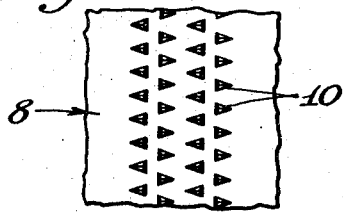
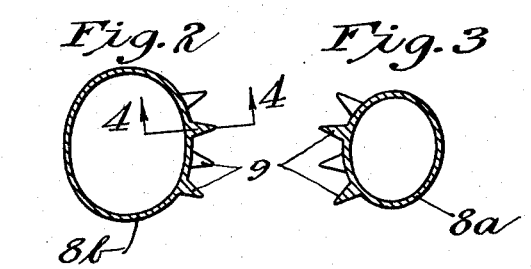
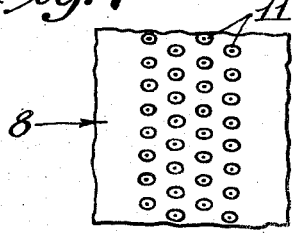
Inventor
Elmer L. Ness
By his Attorneys
Williamson & Williamson Patented May 19, 1936

2,041,262

UNITED STATES PATENT OFFICE 2,041,262

MASSAGING AND CLEANSING DEVICE FOR TEETH AND GUMS

Elmer L. Ness, Minneapolis, Minn.

Application September 23, 1933, Serial No. 690,683

2 Claims. (Cl. 15—188)

This invention relates to devices for massaging and cleansing the teeth and gums.

It is the general object of this invention to provide a novel and efficient device, which can be effectively used by dentists and by others for massaging the gums to stimulate the blood supply thereto as an aid to arrest pyorrhea and other gum and mouth diseases.

It is another object to provide an efficient cleansing device for use in cleaning the teeth and gums, which can be easily used and which can be kept sanitary with a minimum of labor without difficulty.

A more detailed object is to provide a glove-like casing having finger stalls shaped to receive the thumb and forefinger of a human hand and carrying a multiplicity of projections shaped to fit between the teeth.

The objects and advantages of the invention will more fully appear from the following description, made in connection with the accompanying drawing, wherein like reference characters refer to the same or similar parts throughout the various views, and, in which, Fig. 1 is a plan view illustrating an embodiment of the device as applied ready for use on the thumb and forefinger of a human hand;

Fig. 2 is a section taken on the line 2—2 of Fig. 1, as indicated by the arrows, and illustrating one of the finger stalls;

Fig. 3 is a section taken on the line 3—3 of Fig. 1, as indicated by the arrows, and illustrating the other finger stall;

Fig. 4 is a longitudinal section taken on the line 4—4 of Fig. 2, as indicated by the arrows, but showing the finger stall in flattened condition;

Fig. 5 is a view looking toward the inner side of a portion of one of the finger stalls illustrated in Figs. 1 to 4 inclusive, and showing the finger stall in collapsed condition;

Fig. 6 is a view similar to Fig. 5, but illustrating a modification of the invention; and Fig. 7 is a view taken similar to Fig. 5 and illustrating a further modification of the invention.

Referring to the drawing, and first particularly to Figs. 1 to 5 inclusive, a human hand A is illustrated. There is provided in accordance with the invention, a casing 8 formed of partially resilient flexible material such as rubber, or the like, molded to form finger stalls 8a and 8b respectively, and a connecting web 8c. The finger stall 8a is shaped to receive the forefinger of the human hand A, while the finger stall 8b is shaped to receive the thumb of the human hand A. The web 8c connects the inner ends of the two finger stalls 8a and 8b and is adapted to overlie that portion of the human hand A between the bases of the thumb and forefinger. The casing 8 is so made that the finger stalls 8a and 8b will tightly grip the forefinger and thumb respectively, without turning or twisting thereon, by reason of the natural resiliency of the material forming the casing.

On the outer opposing surfaces of the finger stalls 8a and 8b and extending from the tips of these stalls for some little distance towards the bases of the stalls, a multiplicity of projections 9 are formed on the stalls. These projections may be molded with the casing 8 at the time it is formed, or they may be later fused with the casing or secured or attached thereto in any suitable manner. Preferably the projections 9 are arranged transversely of the stalls 8a and 8b in longitudinal rows and the individual projections in each row have bases spaced from each other preferably some little distance corresponding approximately to the spacing center to center between the different adjacent teeth of the mouth. Also preferably the projections 9 in each particular longitudinal row of projections are alternately spaced longitudinally of the stalls 8a and 8b relative to the projections in adjacent rows. The particular projections 9 illustrated are of rectangular pyramidal-shape and project outwardly from their bases connected to the stalls to terminate in blunt points. As will also be noted, the projections 9 are so arranged longitudinally of the stalls that the rectangular bases of the pyramids have parallel edges running longitudinally of the stalls. Also the bases of these pyramids are so arranged that the greatest length edges of the bases extend transversely of the stalls.

In Fig. 6 the casing 8 is shown as having its stalls equipped with longitudinal rows of transversely spaced projections 10 of a different type than the projections 9 illustrated in Figs. 1 to 5 inclusive. The projections 10 are triangular pyramids having their bases connected to the stalls with their pointed ends outermost. For purposes presently to appear, these projections 10 have bases which form isosceles triangles with one side shorter than the other two sides. The shorter sides of these isosceles triangles forming the bases of the pyramidal projections 10 extend longitudinally of the stalls of the casing 8 and the other two sides of the triangles forming these bases, alternately project in opposite directions in different longitudinal rows of the projections 10. As a result of these facts, the more peaked edges of the pyramids of adjacent rows of projections 55

10 extend transversely of the stalls of the casing 8 in opposite directions.

In Fig. 7, projections 11 are shown as being applied to the stalls of the casing 8. These projections 11 are elliptical cones having their bases applied to the stalls and having the longer axes of their elliptical bases extending transversely of the stalls.

The various projections 9, 10, and 11 are preferably, although not necessarily, made of partially resilient material such as semi-hard rubber, or the like. It may be desirable, however, at times and for certain purposes to make these projections of non-resilient material, or of quite soft material.

In using the device, the device is applied to the hand by slipping the finger stalls 8a and 8b over the forefinger and thumb of the hand in such manner that the projections 9, 10 or 11 used face each other. The thumb and forefinger are then held in substantially parallel horizontal relation and these two fingers are inserted in the mouth, so that one of the stalls as the stall 8b bears against the outer sides of a certain group of teeth and gums, while the other stall as the stall 8a, bears against the inner sides of the same teeth and gums. The projections 9, 10, or 11 are then worked into the spaces between adjacent teeth and the hand is raised and lowered relative to the teeth so as to draw out any foreign matter from between the teeth, while removing the film therefrom and massaging the gums. The projections 9, 10 and 11 are worked into the gums to give them a thorough scrubbing and cleansing, while stimulating blood circulation to the gums. As the casing 8 is flexible and, at least, semi-elastic, the fingers may be so arranged that the projections 9, 10 and 11 used closely fit the configuration of the mouth at all points. By stimulating the blood supply to the gums through the massaging action, proper treatment may be given to the gums for treating pyorrhea and other mouth and gum diseases. The massaging action toughens the gums without injury to the tissue. Of course, if the projections 9, 10 and 11 are made of partially resilient material, as they preferably are, these projections are self adapting to the contours of the teeth and gums. When the pyramid projections 9 are used, the edges of these projections act much in the manner as does a squeegee working on glass to clean the teeth. The same may be said of the projections 10, which are triangular pyramids. The projections 10 by reason of the fact that they have more peaked edges extending generally transversely of the stalls 8a and 8b, are particularly effective for working their way between the different teeth. By reason of the fact that the more peaked edges of adjacent rows of projections 10 extend in different directions, certain of the projections will always present their more peaked edges forwardly as the fingers are moved to and from the gums irrespective of which teeth in the mouth are being treated.

The present device can be used much in the manner of a tooth brush by applying tooth paste to the projections 9, 10 or 11 before the device is inserted within the mouth. The device is believed to be more efficient than the ordinary bristle type tooth brush, inasmuch as all areas of the teeth may be reached because of the flexibility of the device to fit the contour of the teeth through finger action. Also the device can be used for cleansing the teeth much quicker than can an ordinary tooth brush by reason of the fact that both the inner and outer sides of the teeth are simultaneously cleaned when the present device is used.

By reason of the conical or pyramidal construction of the various projections 9, 10 or 11, the device can be cleaned and sterilized with great ease. Material will not permanently lodge on the projections and may be easily washed away. The device can be boiled in water without injury whenever necessary.

It will, of course, be appreciated that various types of projections 9, 10 and 11 may be used and that these projections may be spaced different distances apart and may be used in greater or less number as desired. Of course, the size of these projections may be varied as desired. It will also be understood that the finger stalls 8a and 8b will be made of varying sizes to fit different types of hands.

Other changes may be made in the form, details, arrangement and proportions of the various parts without departing from the scope of the present invention, which, generally stated, consists in the matter shown and described and set forth in the appended claims.

What is claimed is:—

1. A massaging and cleansing device for teeth and gums, comprising a finger stall of flexible material and a multiplicity of outwardly extending flexible projections applied to said stall, said projections being in the shape of irregular triangular pyramids having their sharpest peaked edges disposed transversely of a longitudinal axis of said stall.

2. A massaging and cleansing device for teeth and gums, comprising a casing of flexible and partially resilient material shaped to form stalls receiving the thumb and forefinger of a human hand, the said stalls having opposing surfaces and a multiplicity of flexible pyramid-shaped projections applied to said opposing surfaces in longitudinally spaced relation, the bases of said projections being disposed inwardly upon the faces of the stalls and said projections being formed of partially resilient material.

ELMER L. NESS.